United States Patent [19]
Pancotti et al.

[11] Patent Number: 6,077,042
[45] Date of Patent: Jun. 20, 2000

[54] HELICOPTER ROTOR BRAKE

[75] Inventors: Santino Pancotti, Gallarate; Roberto Regonini, Somma Lombardo, both of Italy

[73] Assignee: Finmeccanica S.p.A., Italy

[21] Appl. No.: 09/124,189

[22] Filed: Jul. 28, 1998

[30] Foreign Application Priority Data

Aug. 1, 1997 [IT] Italy .................................. TO97A0711

[51] Int. Cl.[7] .................................................. A47C 7/74
[52] U.S. Cl. .................................... 416/169 R; 188/73.33
[58] Field of Search ..................... 416/32, 152, 169 R; 188/71.1, 73.31, 73.32, 73.33, 73.34

[56] References Cited

U.S. PATENT DOCUMENTS

| | | | |
|---|---|---|---|
| 2,600,715 | 6/1952 | Wheeler | 416/169 R X |
| 3,129,608 | 4/1964 | Watson | 416/169 R X |
| 3,642,104 | 2/1972 | Schafer | 192/18 B |
| 3,977,812 | 8/1976 | Hudgins | 416/169 R X |
| 4,376,614 | 3/1983 | Woodruff | 416/169 R X |
| 4,443,155 | 4/1984 | Smith | 416/169 R X |
| 5,111,914 | 5/1992 | Thiel et al. | 188/73.34 |
| 5,343,986 | 9/1994 | Rogers et al. | 188/73.45 |
| 5,529,459 | 6/1996 | Pancotti | 416/169 R |
| 5,855,471 | 1/1999 | Chory | 416/169 R |

*Primary Examiner*—John E. Ryznic
*Attorney, Agent, or Firm*—Liniak, Berenato, Longacre & White

[57] ABSTRACT

A helicopter rotor brake having a disk connected angularly to a helicopter rotor; a brake caliper having friction members cooperating with the disk; and an actuating device for moving the brake caliper, parallel to the plane of the disk, between a work position engaging the disk and wherein the brake caliper may be operated to brake the rotor, and a safety position releasing the disk and wherein any possibility of the friction members interacting with the disk is prevented.

13 Claims, 3 Drawing Sheets

HELICOPTER ROTOR BRAKE

BACKGROUND OF THE INVENTION

The present invention relates to a helicopter rotor brake.

As is known, helicopters are equipped with a brake for rapidly arresting the rotor on landing.

Rotor disk brakes are known, which comprise a disk connected angularly to the rotor; and a brake caliper having friction members between which the disk is interposed, and which cooperate with the disk when the caliper is operated to brake the rotor.

Though measures are normally taken to prevent the caliper being operated in flight, a remote possibility still exists, in the event of a malfunction, of the friction members cooperating with the disk even without the caliper being operated, thus resulting in heat being generated due to friction.

Despite all the precautions taken, overheating of the brake may not only impair operation of the brake itself but also, in extreme cases, endanger flight of the aircraft.

SUMMARY OF THE INVENTION

It is an object of the present invention to provide a helicopter rotor brake designed to eliminate the aforementioned drawback.

According to the present invention, there is provided a helicopter rotor brake comprising a disk fitted integrally to a transmission member connected angularly to a helicopter rotor; a caliper having friction means cooperating with said disk to brake said rotor; and supporting means for supporting said caliper; characterized by comprising actuating means interposed between said supporting means and said caliper to move said caliper, parallel to the plane of the disk, between a work position engaging said disk and wherein said friction members face the disk and cooperate with the disk when said caliper is operated, and a safety position releasing said disk and wherein said friction members are moved from the disk in a direction parallel to a plane of the disk.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
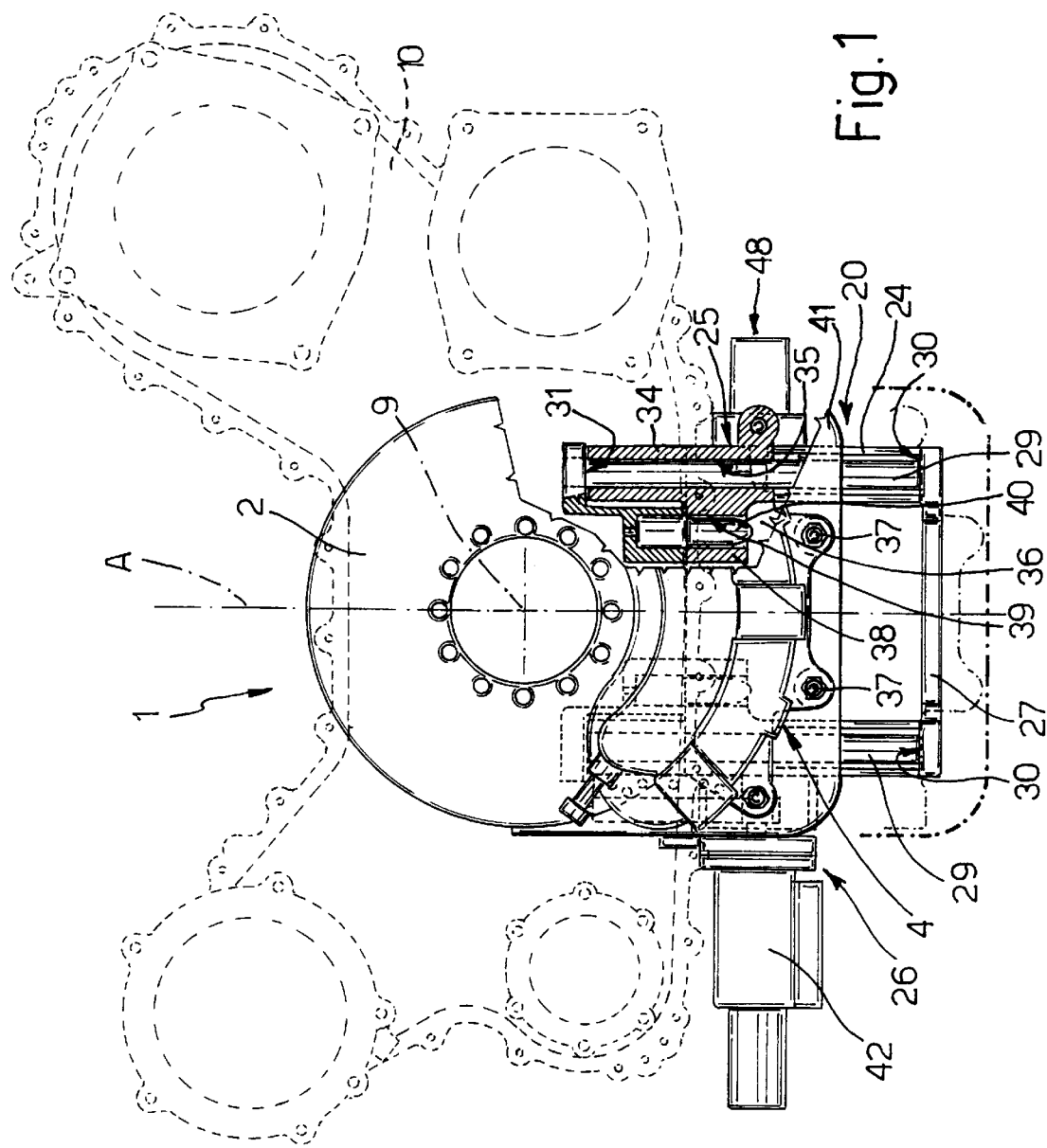
FIG. 1 shows a front view of a helicopter rotor brake in accordance with the present invention.
Figure 2:
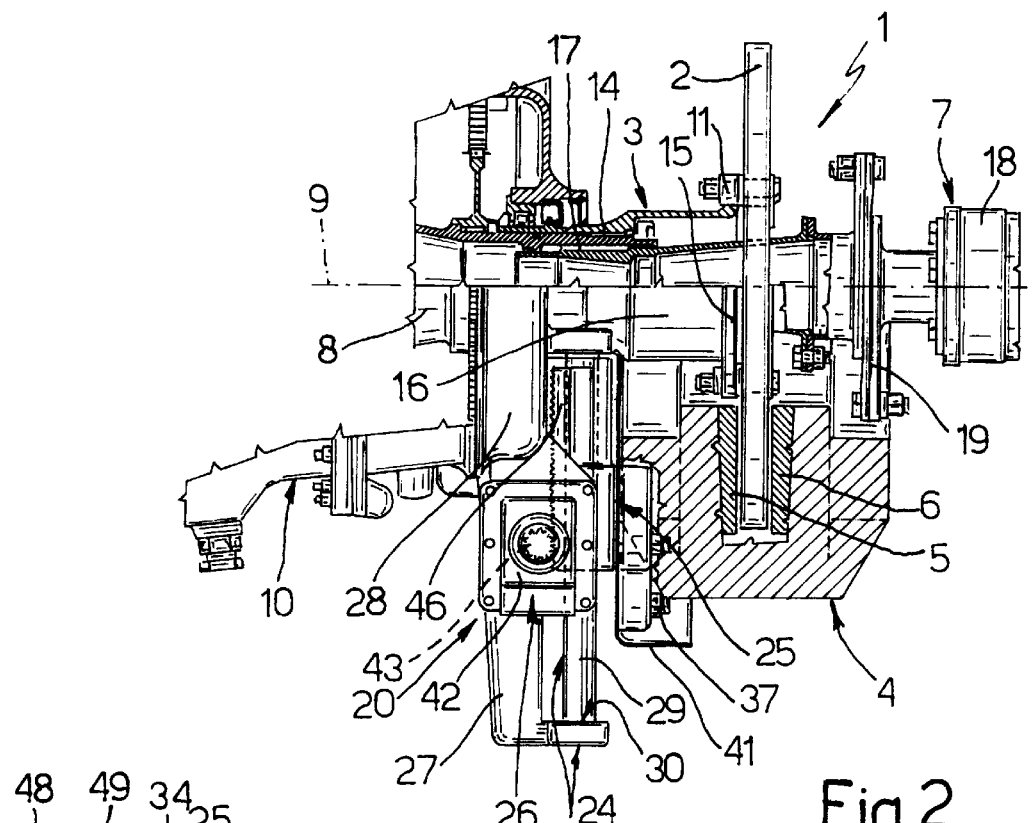
FIG. 2 shows a partially sectioned side view of the FIG. 1 rotor brake.
Figure 3:
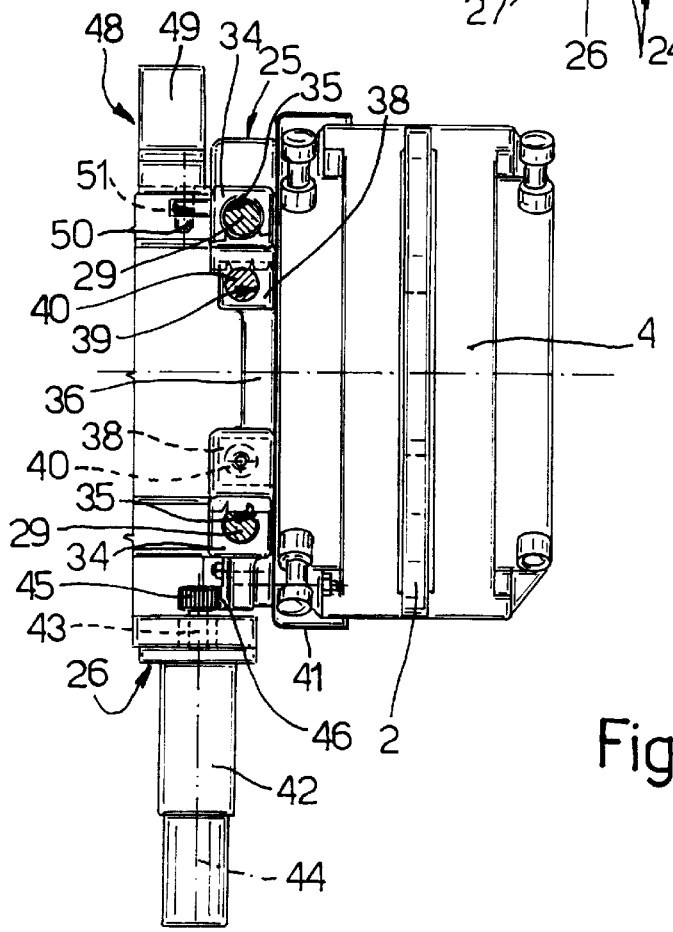
FIG. 3 shows a top plan view, with parts removed for clarity, of the FIG. 1 rotor brake.

With reference to FIGS. 1–3, number 1 indicates as a whole a rotor brake for a helicopter (not shown).

Rotor brake 1 comprises a known disk 2 fitted integrally to a hub 3 (FIG. 2) connected angularly to a rotor (not shown) of the helicopter; and a caliper 4 having friction members 5, 6 which cooperate with disk 2 to brake the rotor.

More specifically, hub 3 is rotationally integral with a transmission line 7 interposed between the main transmission (not shown) of the helicopter and a tail rotor (not shown).

Transmission line 7 comprises a first shaft 8, which is connected angularly (not shown) to the main transmission and extends along an axis 9 through a gearbox 10 of the main transmission.

Hub 3 of disk 2 is coaxial with first shaft 8, is connected to shaft 8 by a splined coupling 14 outside shaft 8, and comprises a radial flange 15 to which disk 2 is fitted rigidly by means of a ring of bolts 11.

Transmission line 7 also comprises a second shaft 16, which is internally coaxial with hub 3 and disk 2, and is connected to first shaft 8 by a splined coupling 17 inside shaft 8. Transmission line 7 also comprises a number of segments 18 connected in series with one another, and of which only the segment 18 adjacent to second shaft 16 and connected to shaft 16 by a joint 19 is shown.

According to the present invention, rotor brake 1 comprises an actuating device 20 for supporting and moving caliper 4, along the plane of and radially with respect to disk 2, between a work position wherein friction members 5, 6 are positioned facing opposite sides of disk 2, and a safety position wherein friction members 5, 6 are withdrawn from disk 2. More specifically, caliper 4 is set to said work position when the helicopter is grounded, so that the caliper may be operated to grip disk 2 between friction members 5, 6 and so arrest the rotor, and is set to said safety position when the helicopter is in flight, to prevent any danger, in the event of a malfunction, of friction members 5, 6 contacting disk 2.

Actuating device 20 comprises a guide 24 integral with gearbox 10; a slide 25 supporting caliper 4 and fitted to guide 24 so as to slide in a radial, in particular vertical, direction A with respect to disk 2; and an activating device 26 carried by guide 24, and which provides for moving slide 25, in direction A, between a first raised position (shown in FIG. 2 and by the continuous line in FIG. 1) in which caliper 4 is in the work position, and a second lowered position (shown partly by the dot-and-dash line in FIG. 1) in which caliper 4 is in the safety position.

More specifically, guide 24 is carried by a substantially U-shaped support 27 formed in one piece with and extending substantially downwards from a cover 28 of gearbox 10, and comprises a pair of guide columns 29 parallel to each other and to direction A. Each column 29 is fitted rigidly to support 27, and extends between a bottom limit stop 30 and a top limit stop 31, both defined by support 27 itself.

Slide 25 comprises a pair of prismatic lateral elements 34 (FIG. 3), each having an axial through hole 35 engaged in sliding manner by a respective column 29 to form a sliding connection between guide 24 and slide 25; and a transverse body 36 integrally connecting elements 34 and fitted at the front with caliper 4 by means of a number of studs 37. Alongside each prismatic element 34, transverse body 36 forms a respective prismatic projection 38 having a respective locating hole 39 with an axis parallel to the axes of holes 35.

When slide 25 is in the raised position, holes 39 are engaged by respective pins 40 (FIGS. 1 and 3) fixed to support 27, so as to form an auxiliary connection between slide 25 and support 27 to strengthen the slide-caliper assembly and help balance the torque reaction generated, when braking, on caliper 4 substantially projecting from slide 25.

A protective sheet metal casing 41, interposed between slide 25 and caliper 4, prevents any particles, produced by wear of the friction material during braking, from fouling the outer parts of caliper 4, and in particular from settling on columns 29.

As shown in FIG. 3, activating device 26 is fitted laterally to support 27, and comprises an electric motor 42 having an output shaft 43 fitted with a pinion 45 and having an axis 44 perpendicular to direction A and axis 9. Pinion 45 meshes with a rack 46 (FIG. 2) fitted to slide 25, so as to move slide 25 between said first and second positions; and rack 46 extends in a direction parallel to direction A, and is fitted to an outer side of one of elements 34.

Actuating and supporting device 20 also comprises a safety device 48 (FIG. 3) for locking slide 25 with respect to guide 24 when slide 25 is in the raised position. Safety device 48 is fitted laterally to support 27, on the opposite side to activating device 26, and comprises a linear actuator 49 having an axis perpendicular to direction A and in turn comprising an output member 50, which, when slide 25 is in the raised position, is movable axially to engage a seat 51 formed in an appendix extending integrally from one of elements 34.

Motor 42 and actuator 49 are controlled by a control unit (not shown) operating, on the basis of a memorized program, in response to rotor brake enabling/disabling signals received from a manually-operated selecting device (not shown) in the pilot's cabin.

Rotor brake 1 operates as follows.

When the rotor brake is enabled, in particular when the helicopter is grounded, slide 25 is maintained in the raised position by safety device 48, so that caliper 4 may be operated to grip disk 2 and brake the rotor.

When the rotor brake is disabled, in particular before takeoff of the helicopter, caliper 4 releases disk 2 to permit rotation of the main transmission and the rotors (main and tail rotor) powered by the main transmission. Then, the control unit releases safety device 48 to withdraw output member 50 of linear actuator 49 from seat 51, and operates motor 42 to lower slide 25 and set caliper 4 to the safety position preventing contact between friction members 5, 6 and disk 2.

When rotor brake 1 is enabled on landing, the above operations are performed in reverse to restore and maintain caliper 4 in the work position and operate the caliper by bringing friction members 5, 6 into contact with disk 2.

Figure 5:
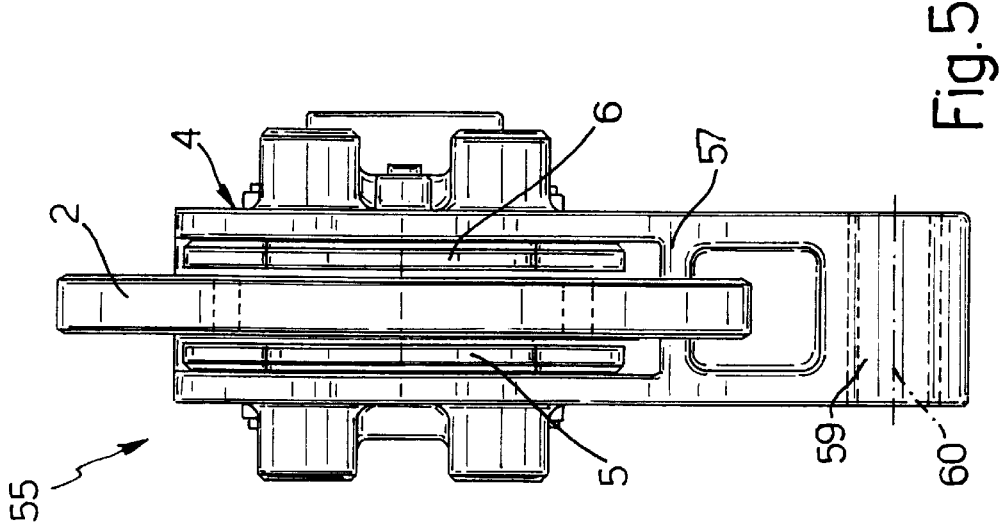
FIG. 5 shows a side view of the FIG. 4 rotor brake.
Figure 4:
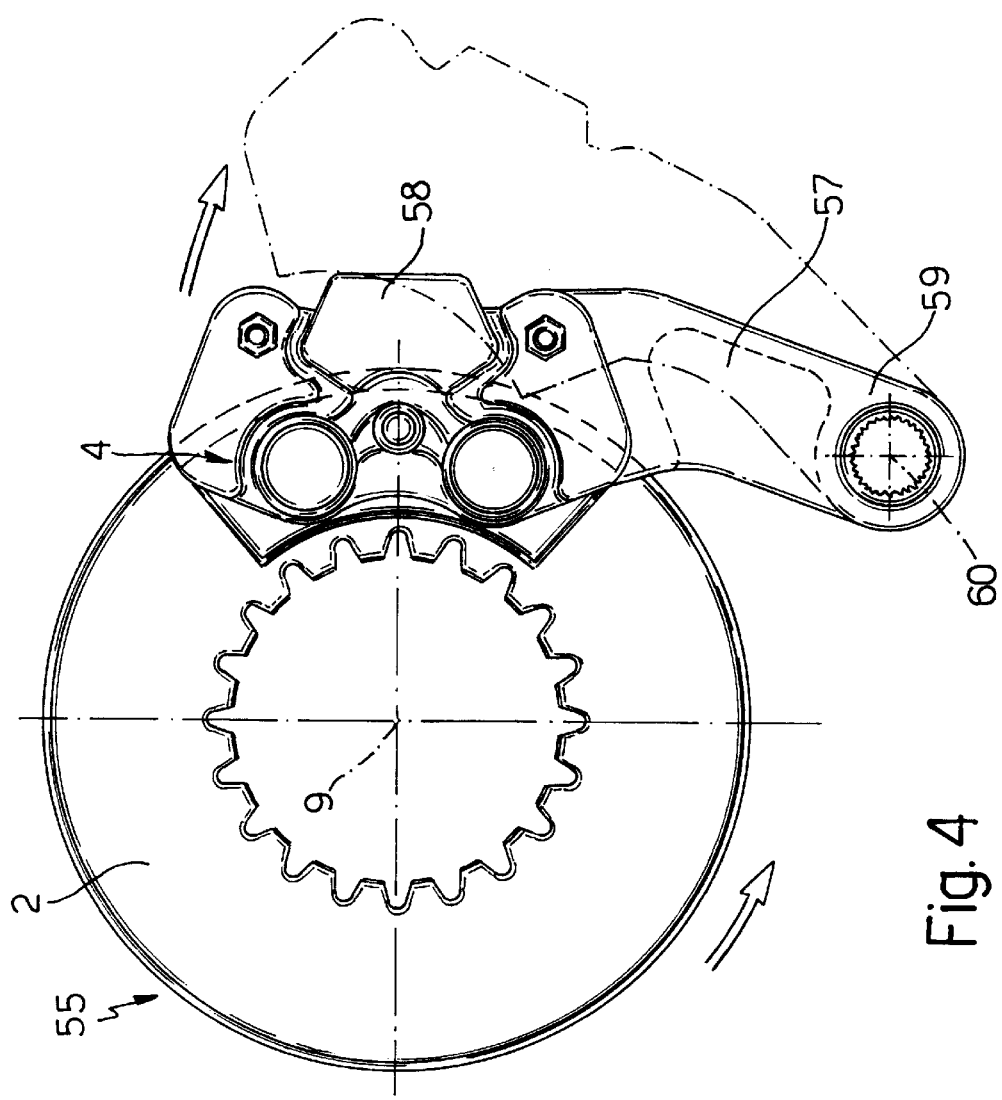
FIG. 4 shows a schematic front view of a helicopter rotor brake according to a further embodiment of the present invention.

Number 55 in FIGS. 4 and 5 indicates as a whole a rotor brake according to a further embodiment of the invention, and which is described below only insofar as it differs from brake 1, and using the same numbering system for any parts corresponding to those already described.

Rotor brake 55 comprises an arm 57 for supporting and activating caliper 4, and which in turn comprises a first end 58 connected rigidly to caliper 4, and a second end 59 connected to a powered member (not shown), which has an axis 60 parallel to axis 9 of disk 2 and provides for rotating arm 57, about axis 60, between two limit positions corresponding respectively to a work position of caliper 4 (shown by the continuous line) wherein disk 2 is interposed between friction members 5, 6 of caliper 4, and a caliper safety position (shown by the dot-and-dash line) wherein caliper 4 is detached or moved radially from disk 2.

Rotor brake 55 operates in substantially the same way as brake 1, except that the movement of caliper 4 between the work and release positions is rotary as opposed to translatory. The relationship between the work and safety positions and the operating conditions of the helicopter is the same as already described.

The advantages of rotor brakes 1 and 55 in accordance with the teachings of the present invention will be clear from the foregoing description.

In particular, when the rotor brake is disabled, brake caliper 4 is released from disk 2 in such a way as to prevent any possibility of friction members 5, 6 of the caliper interacting with disk 2.

Clearly, changes may be made to brakes 1, 55 as described and illustrated herein without, however, departing from the scope of the present invention.

In particular, caliper 4 may be moved between the work and safety positions using any type of mechanism, e.g. an articulated parallelogram or lever mechanism.

What is claimed is:

1. A helicopter rotor brake (1) comprising a disk (2) fitted integrally to a transmission member (3) connected angularly to a helicopter rotor; a caliper (4) having friction means (5, 6) cooperating with said disk (2) to brake said rotor; and supporting means (27) for supporting said caliper (4); characterized by comprising actuating means (20) interposed between said supporting means (27) and said caliper (4) to move said caliper (4), parallel to the plane of the disk (2), between a work position engaging said disk (2) and wherein said friction members (5, 6) face the disk (2) and cooperate with the disk when said caliper (4) is operated, and a safety position releasing said disk (2) and wherein said friction members (5, 6) are withdrawn from the disk (2).

2. A brake as claimed in claim 1, characterized in that said actuating means (20) comprise guide means (24) for guiding said caliper (4) along a substantially straight path (A).

3. A brake as claimed in claim 2, characterized in that said guide means comprise a guide (24) integral with said supporting means (27) and extending crosswise to an axis (9) of said disk (2); said actuating means (20) comprising a slide (25) supporting said caliper (4) and connected to said guide (24) so as to slide along said path (A), and an activating device (26) for moving said slide (25) between a first and a second position respectively corresponding to said work position and said safety position of said caliper (4).

4. A brake as claimed in claim 3, characterized in that said guide (24) comprises a pair of rodlike guide elements (29) parallel to each other and to said path; and in that said slide (25) comprises a pair of tubular elements (34), each engaged in sliding manner by a respective rodlike guide element (29).

5. A brake as claimed in claim 3, characterized in that said activating device (26) comprises an electric motor (42) fixed to said supporting means (27); and transmission means (45, 46) interposed between said electric motor (42) and said slide (25).

6. A brake as claimed in claim 5, characterized in that said transmission means comprise a rack (46) fitted to said slide (25); and a gear (45) powered by said electric motor (42) and meshing with said rack (46).

7. A brake as claimed in claim 3, characterized by comprising auxiliary connecting means (39, 40) interposed between said supporting means (27) and said slide (25), and which are active in said first position of said slide (25) to at least partly balance the torque reaction generated when braking.

8. A brake as claimed in claim 7, characterized in that said auxiliary connecting means (39, 40) comprise pin means (40) integral with said supporting means (27), and respective seats (39) formed on said slide (25); said seats (39) being engaged by said pin means (40) in said first position of said slide (25).

9. A brake as claimed in claim 3, characterized by comprising safety lock means (48) for locking said slide (25) in said first position.

10. A brake as claimed in claim 9, characterized in that said safety lock means (48) comprise a linear actuator (49) integral with said guide and having an output member (50) movable crosswise to the traveling direction of said slide (25); and a seat (51) carried by said slide (25) and selectively engaged by said output member (50).

11. A brake as claimed in claim 3, characterized by comprising a protective casing (41) interposed between said caliper (4) and said guide (24).

12. A brake as claimed in claim 1, characterized in that said actuating means comprise guide means (57) for guiding said caliper (4) along a substantially circular path.

13. A brake as claimed in claim 12, characterized in that said guide means comprise an arm (57) carrying said caliper (4) and rotating, about an axis of rotation (60) parallel to an axis (9) of said disk (2), between limit positions respectively corresponding to said work position and said safety position of said caliper (4).

* * * * *